United States Patent [19]

Bradford et al.

[11] Patent Number: 5,119,627
[45] Date of Patent: Jun. 9, 1992

[54] EMBEDDED PRESSURIZATION SYSTEM FOR HYBRID ROCKET MOTOR

[75] Inventors: Michael D. Bradford, Santa Maria; Bevin C. McKinney, Ventura, both of Calif.

[73] Assignee: American Rocket Company, Camarillo, Calif.

[21] Appl. No.: 431,660

[22] Filed: Nov. 3, 1989

[51] Int. Cl.5 .................................................. F02K 9/00
[52] U.S. Cl. ....................................... 60/251; 60/253; 60/254; 102/287; 102/288; 102/289
[58] Field of Search .............. 60/251, 252, 253, 254, 60/255, 256, 257, 258, 259, 39.48; 102/287, 288, 289, 290, 291

[56] References Cited

U.S. PATENT DOCUMENTS

| | | | |
|---|---|---|---|
| 2,671,312 | 3/1954 | Roy | 60/251 |
| 2,923,126 | 2/1960 | Precoul | 60/255 |
| 3,068,641 | 12/1962 | Fox | 60/251 |
| 3,214,906 | 11/1965 | Coleal | 60/251 |
| 3,323,308 | 6/1967 | Greco | 60/240 |
| 3,325,998 | 4/1965 | Novotny | 60/251 |
| 3,457,727 | 7/1969 | Munger | 60/251 |
| 3,613,583 | 10/1971 | Lai | 60/251 |
| 3,715,888 | 2/1973 | Massie | 60/251 |
| 3,789,610 | 2/1974 | Stone | 60/251 |
| 3,812,671 | 5/1974 | Burr et al. | 60/39.48 |
| 3,945,203 | 3/1976 | Rayser | 60/259 |

*Primary Examiner*—Richard A. Bertsch
*Assistant Examiner*—Howard R. Richman

[57] ABSTRACT

A solid propellant component grain is supported in a combustion chamber. A liquid propellant component container is mounted forward of the combustion chamber. The liquid propellant component is supplied through conduits from the container into the combustion chamber, and ignited to form combustion gas which is discharged out the rear of the combustion chamber to generate thrust for propelling a rocket. A high pressure tank containing a non-flammable gas such as helium is at least partially embedded in the grain. A conduit leads from the tank into the container, such that the high pressure gas pressurizes the container and urges the liquid propellant component to flow from the container into the combustion chamber. The tank provides internal structural support for the grain, with the wall of the combustion chamber constituting a safety barrier in the event of structural failure of the tank after the tank is filled with high pressure gas.

15 Claims, 2 Drawing Sheets

EMBEDDED PRESSURIZATION SYSTEM FOR HYBRID ROCKET MOTOR

BACKGROUND OF THE INVENTION

1. Field of the Invention

The present invention generally relates to the art of rocket propulsion systems, and more specifically to an improved configuration for a hybrid rocket engine which utilizes a tank filled with high pressure non-flammable gas to pressurize a liquid propellant component container.

2. Description of the Related Art

A hybrid rocket engine or motor is a cross between a solid propellant rocket and a liquid propellant rocket. A hybrid rocket utilizes a liquid oxidizer to burn a solid fuel element. A reverse hybrid rocket applies a combustible liquid fuel to a solid oxidizer. The hybrid rocket propellant can be ignited by an igniter such as an electrically generated spark, or by initial injection of an ignition fluid which exothermically reacts with the liquid oxidizer. An example of a conventional hybrid rocket configuration is presented in U.S. Pat. No. 3,323,308, issued Apr. 9, 1964, entitled "CONSTANT FLOW, VARIABLE AREA HYBRID ENGINE INJECTOR", to J. Greco.

A hybrid engine provides the following basic advantages over a purely solid or liquid fuel rocket engine: (1) the complete separation of fuel from the principal oxidizer, eliminating the potential for uncontrolled mixing, (2) the capability to use an optimum combination of propellant ingredients regardless of whether these are solid or liquid, and (3) the capability to easily stop and restart the engine. Hybrid engines have the potential for low cost, reliability, and safety. In addition to its on-off capability, the engine is easily throttleable since there is only one liquid component. Since the solid fuel components need not contain any oxidizer, they are easily produced under less hazardous conditions.

A conventional hybrid rocket engine includes a hollow housing or combustion chamber in which an elongated solid fuel propellant component or grain is mounted. The fuel grain typically has a "wagon wheel" cross section, with a central hollow hub, a rim, and a plurality of spokes joining the hub to the rim. The spaces between the spokes are hollow, allowing flow of combustion gas through the length of the fuel grain. Liquid oxidizer is provided in a tank or container mounted forward of the fuel grain, and caused to flow through the fuel grain and out a nozzle mounted at the rear end of the combustion chamber. Ignition causes combustion of the fuel-oxidizer mixture at the surfaces of the fuel grain, resulting in the generation of thrust as the high pressure combustion products are discharged out of the combustion chamber through the nozzle.

It is essential to sustain the flow of the liquid propellant component into the combustion chamber for as long a period of time and with as constant a pressure as possible to completely utilize the fuel grain. Methods of pressurizing the liquid component container to cause the liquid flow therefrom at a controlled rate include: (1) stored gas systems, (2) oxidizer evaporation systems, (3) systems evaporating non-propellants, (4) systems using products of chemical reactions, (5) autogenous systems and auxiliary pumping systems.

The present invention improves on the type (1) system which utilizes a stored gas, or alternatively a turbopump feed system. In the conventional arrangement, a non-flammable gas such as helium or nitrogen is provided in a high pressure cylinder or tank which is mounted external of the combustion chamber and liquid propellant component container. The high pressure gas is fed into the container through an appropriate regulator or throttle valve to create a pressure in the container selected to force the liquid propellant component into the combustion chamber at a desired flow rate.

A major problem inherent in the conventional hybrid rocket engine design is that it is difficult to burn all of the fuel grain in a controlled manner. Where an attempt is made to burn the entire fuel grain, a point is reached where a central unburned portion separates from the main body from the grain, and is moved by the combustion gas flow into the nozzle area, causing a major reduction in thrust. This catastrophic change may be avoided by burning the fuel grain only down to a point at which separation will not occur. However, this results in wasting the remaining portion of the fuel grain, and thereby precious space and weight in the rocket motor.

The wagon wheel grain configuration represents an optimal ratio of exposed surface area to cross sectional area. However, the central hub is generally hollow, and thereby unused, representing wasted space in the motor. Since the hub is supported only by the spokes which become progressively burned away during operation of the motor, the possibility that the hub will deleteriously separate from the main body of the grain toward the end of the fuel burn as discussed above is substantial.

Another problem inherent in a conventional stored gas pressurization system is that the pressurizing gas is stored in the tank at very high pressure, on the order of 6000 psi. Structural failure of the tank would create an extremely dangerous situation, possibly resulting in serious injury to personnel and damage to facilities in the vicinity of the ruptured tank.

SUMMARY OF THE INVENTION

The present invention overcomes the drawbacks inherent in conventional hybrid rocket motors by providing a module including a solid propellant component grain, which may be fuel or oxidizer, and a pressurizing gas tank which is at least partially imbedded in the grain. The module is supported in a housing, which constitutes a combustion chamber, into which a liquid propellant component which forms a combustible mixture with the solid propellant component, is forced by pressurized gas from the tank. The tank is mounted in a central portion of the fuel grain, which may be unused in conventional rocket motors, thereby increasing the overall volumetric efficiency of the hybrid propulsion system.

A container for the liquid propellant component is mounted forward of the combustion chamber. The liquid propellant component is supplied through conduits from the container into the combustion chamber, and ignited to form a combustion gas which is discharged out the rear of the combustion chamber to generate thrust. A conduit leads from the tank into the container, such that the high pressure gas pressurizes the container and urges the liquid propellant component to flow from the container into the combustion chamber. The tank provides internal structural support and a structurally stable surface for the fuel grain, with the wall of the combustion chamber constituting a safety barrier in the event of structural failure of the tank after the tank is filled with high pressure gas.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
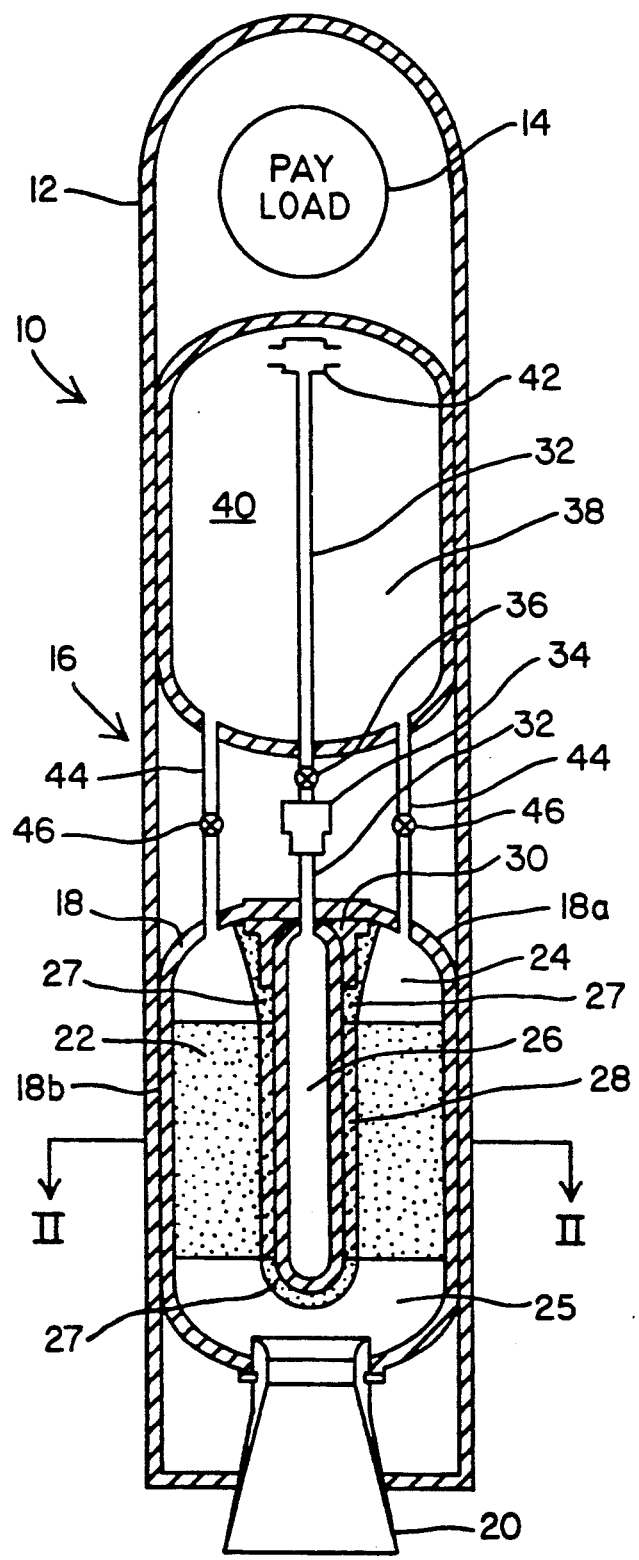
FIG. 1 is a simplified sectional view of a hybrid rocket motor propulsion system embodying the present invention.

Referring now to FIG. 1 of the drawing, a hybrid propellant rocket is generally designated as 10, and includes an outer casing or shell 12. A payload 14, which is to be carried into space by the rocket 10 to accomplish a desired mission, is supported within the shell 12. Propulsion for the rocket 10 is provided by a hybrid rocket motor propulsion system 16 embodying the present invention, which includes a motor housing 18 coaxially supported within the shell 12.

The housing 18, which constitutes a combustion chamber, is generally cylindrical in shape, and has a front end wall 18a. A nozzle 20 is fitted to the rear end of the housing 18, for discharge of combustion gas rearwardly from the housing 18 to generate thrust. A generally cylindrical solid propellant component grain 22 is supported in the housing 18, with the peripheral portion of the grain 22 supported by an inner cylindrical wall 18b of the housing 18. Front and rear combustion gas mixing chambers 24 and 25 are provided forwardly and rearwardly respectively of the grain 22 inside the combustion chamber or housing 18.

In accordance with the present invention, a high pressure gas cylinder or tank 26 is at least partially imbedded in the propellant component grain 22 to constitute a module therewith. As illustrated, front and rear portions of the tank 26 protrude from the grain 22, although it is within the scope of the invention to completely imbed the tank in the grain (although in such a case a conduit must be provided leading from the tank external of the grain). If desired, a thermally insulative material 28 such as silicon elastomer or phenolic resin may be provided between the tank 26 and grain 22.

Although the ends of the tank 26 are not embedded in the grain 22, they are preferably coated with solid fuel component as indicated at 27 to protect the ends of the tank 26 from the high temperature combustion gas in the mixing chambers 24 and 25.

The tank 26 is supported at its front end portion by means such as a flange 30 extending into the housing 18 from the front end wall 18a thereof. A conduit 32 leads from the tank 26 through a pressure regulator 34 and gas control or throttle valve 36 into a container 38 which contains a liquid propellant component 40. The forward end of the conduit 32 terminates in a distributor nozzle or diffuser 42 which facilitates even distribution of gas from the tank 26 into the interior of the container 38. Conduits 44 lead through oxidizer control or throttle valves 46 into the mixing chamber 24.

The solid propellant component which forms the grain 22 may be a fuel, or in a reverse hybrid configuration, a solid oxidizer. The liquid propellant component 40, is the other of the fuel or oxidizer. The solid propellant component may be, by way of example, a fuel grain including a hydrocarbon resin formed of polyethylene, polystyrene, or polybutadiene. In this configuration, the liquid propellant component is an oxidizer which may include liquid oxygen.

The tank 26 contains a non-flammable pressurizing gas such as helium or nitrogen. The gas is supplied from the tank 26 into the container 38 for producing high pressure therein which causes the liquid propellant component 40 to flow from the container 38 through the conduits 44 into the combustion chamber 18.

In operation, the liquid propellant component 40 is supplied into the mixing chamber 24 and ignited pyrotechnically or chemically by a suitable means (not shown). The liquid propellant component 40 flows through longitudinal flow passageways in the grain 22, which will be described below, and forms a combustible mixture with vapor from the solid propellant component in the grain 22 to create a flame front at a boundary layer therebetween. The burning gas expands with high pressure, and flows from the combustion chamber 18 out the nozzle 20, creating thrust which propels the rocket 10 forwardly.

Figure 2:
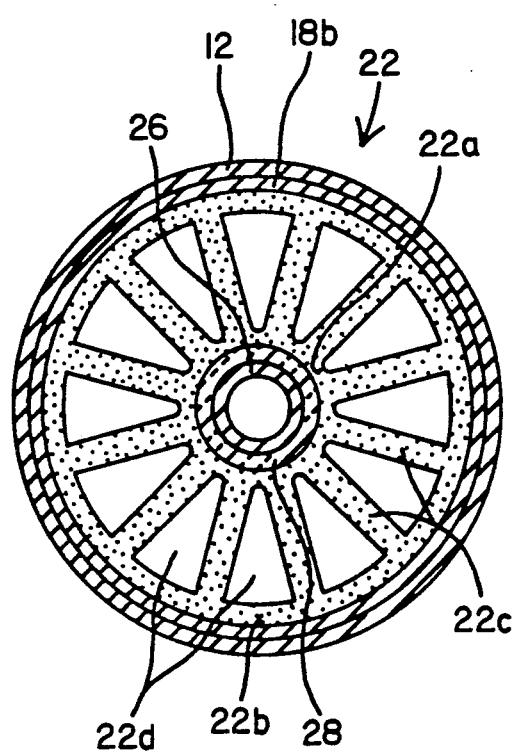
FIG. 2 is a section taken on a line II—II of FIG. 1.

As further illustrated in FIG. 2, the propellant grain 22 may have a "wagon wheel" configuration, with a central hub 22a, a rim 22b, and a plurality of spokes 22c interconnecting the hub 22a and rim 22b. Longitudinal spaces 22d between the spokes 22c constitute passageways for combustion gas flow through the grain 22, which are radially outward of the radially central location of the tank 26.

The grain 22 is supported at its periphery by the wall 18b of the housing 18, and at the inner surface of the hub 22a by the tank 26. This provides increased structural support for the grain 22 over a conventional configuration, in which the grain is supported only at its periphery. In addition, the hub 22a will remain attached to the tank 26 even if the spokes 22c are completely burned away, eliminating catastrophic failure of the motor caused by detachment of the central portion of the grain as discussed above. The outer surface of the tank 26 provides a stable surface for adhesion of a fuel grain in a wagon wheel or any other configuration, enabling complete burning of the central portion of the grain.

The wall of the housing 18 constitutes a barrier for containing shrapnel produced by structural failure and rupture of the high pressure tank 26, an important safety feature provided by the present invention.

A wide variety of fuel can be used in the grain 22. The grain 22 may be formed by casting or injection molding, by way of example, to constitute a module in combination with the embedded tank 26. The grain 22 and tank 26 may be formed as a unit, and then assembled into the housing 18. Alternatively, the tank 26 may be placed in the housing 18, and the grain 22 cast or injection molded directly into the housing 18 around the tank 26.

In an exemplary application, the tank 26 may be approximately 12 inches in diameter, and have an inner liner of aluminum or stainless steel approximately 60 mills thick. A composite overwrap of high strength Kelvar material or carbon on the order of 1-1.5 inches thick is formed on the liner. An additional layer of silicon elastomer or phenolic resin approximately 0.1 inches thick may be provided between the liner and overwrap.

Figure 3:
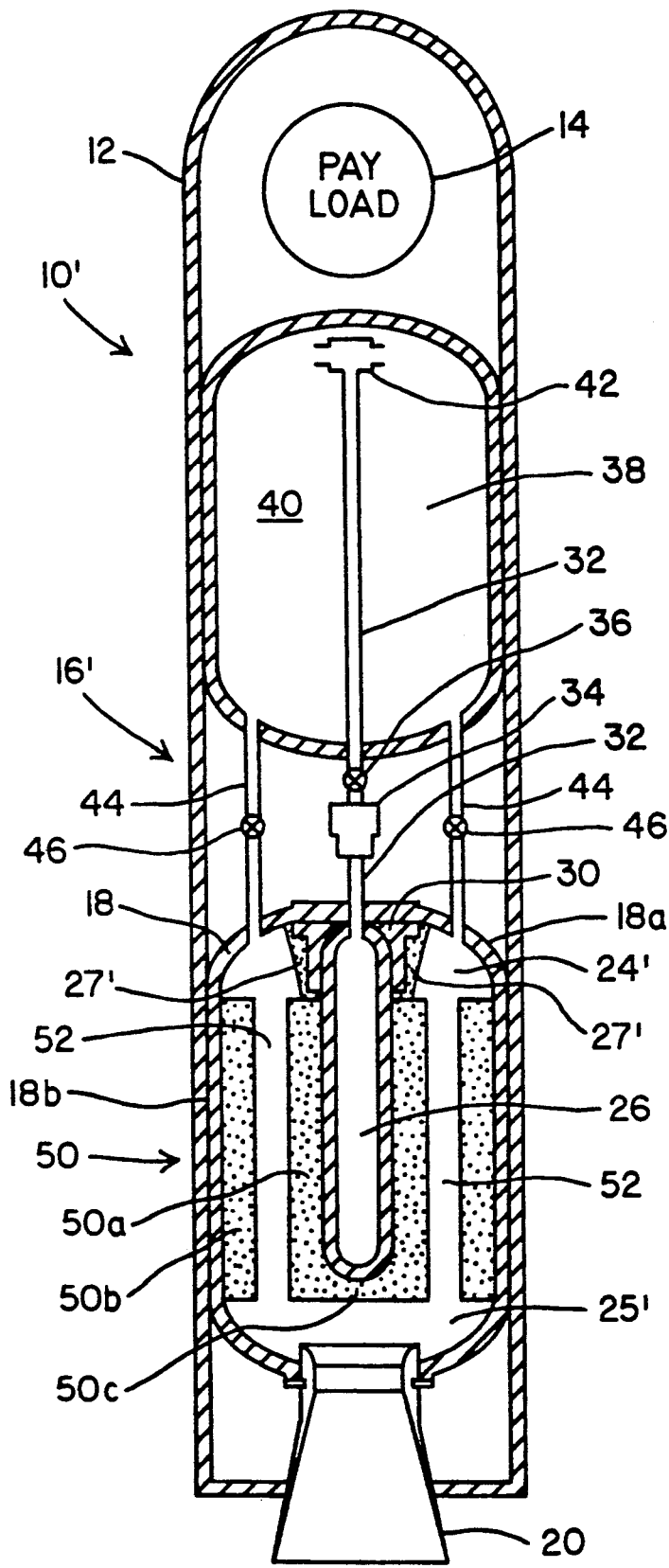
FIG. 3 is a simplified sectional view illustrating modifications to the rocket motor propulsion system illustrated in FIG. 1.

FIG. 3 illustrates an alternative embodiment of the present invention, in which like elements are designated by the same reference numerals used in FIG. 1, and similar but modified elements designated by the same reference numerals primed.

In FIG. 3, a modified propellant grain 50 includes a first generally annular section 50a formed on the outer surface of the tank 26, and an annular section 50b formed on the inner surface of the wall 18b of the housing 18. The section 50a has a closed rear end portion 50c. The tank 26 is completely imbedded in the grain 50 except at its forward end. A passageway 52 for flow of combustion gas through the combustion chamber 18 is defined between the sections 50a and 50b of the grain 50. The insulative layer 28 is optional, and is omitted in the configuration of FIG. 3.

While several illustrative embodiments of the invention have been shown and described, numerous variations and alternate embodiments will occur to those skilled in the art, without departing from the spirit and scope of the invention. Accordingly, it is intended that the present invention not be limited solely to the specifically described illustrative embodiments. Various modifications are contemplated and can be made without departing from the spirit and scope of the invention as defined by the appended claims.

We claim:

1. A module for mounting inside a combustion chamber of a hybrid rocket motor, comprising:
    a solid propellant component grain; and
    a gas tank for containing a liquid propellant component pressurizing gas, the tank being at least partially imbedded in and providing support for the grain.

2. A module as in claim 1, in which the grain is formed with longitudinal flow passageways for combustive flow of said liquid propellant component therethrough, the tank being imbedded in a radially central portion of the grain with the flow passageways formed radially outward thereof.

3. A module as in claim 1, in which the grain comprises a central hub in which the tank is embedded, an outer ring, and a plurality of radial spokes interconnecting the hub and ring, the flow passageways being defined between the spokes.

4. A module as in claim 1, further comprising a thermally insulative material provided between the tank and the grain.

5. A module as in claim 1, in which said solid propellant component comprises a fuel, and said liquid propellant component comprises an oxidizer.

6. A module as in claim 1, in which said solid propellant component comprises an oxidizer, and said liquid propellant component comprises a fuel.

7. A module as in claim 9, further including a housing which constitutes said combustion chamber and supports the grain and tank therein.

8. In a hybrid rocket motor including a combustion chamber, a liquid propellant component container disposed outside the combustion chamber, and first conduit means leading from the container into the combustion chamber, the combination comprising:
    a solid propellant component grain supported inside the combustion chamber;
    a pressurizing gas tank supported inside the combustion chamber which is at least partially imbedded in and provides support for the grain; and
    second conduit means leading from the tank into the container.

9. A rocket motor as in claim 8, in which the grain is formed with longitudinal flow passageways for combustive flow of said liquid propellant component therethrough, the tank being imbedded in a radially central portion of the grain with the flow passageways formed radially outward thereof.

10. In a hybrid rocket motor including a combustion chamber, a liquid propellant component container disposed outside the combustion chamber, and first conduit means leading from the container into the combustion chamber, the combination comprising:
    a solid propellant component grain supported inside the combustion chamber;
    a pressurizing gas tank which is at least partially imbedded in and provides support for the grain; and
    second conduit means leading from the tank into the container;
    the grain being formed with longitudinal flow passageways for combustive flow of said liquid propellant component therethrough, the tank being imbedded in a radially central portion of the grain with the flow passageways formed radially outward thereof;
    the grain comprising a central hub in which the tank is embedded, an outer ring, and a plurality of radial spokes interconnecting the hub and ring, the flow passageways being defined between the spokes.

11. A rocket motor as in claim 8, further comprising a thermally insulative material provided between the tank and the grain.

12. A rocket motor as in claim 8, in which said solid propellant component comprises a fuel, and said liquid propellant component comprises an oxidizer.

13. A rocket motor as in claim 8, in which said solid propellant component comprises an oxidizer, and said liquid propellant component comprises a fuel.

14. A rocket motor as in claim 8, further comprising means for supporting a forward end of the tank in the combustion chamber.

15. A rocket motor as in claim 8, further comprising means for supporting a radially outward portion of the grain in the combustion chamber.

* * * * *